United States Patent
Chikazawa et al.

(10) Patent No.: US 6,371,010 B1
(45) Date of Patent: Apr. 16, 2002

(54) FRYER

(75) Inventors: Hideo Chikazawa, Aichi; Tsuneyasu Hayakawa; Hideki Kijimoto, both of Nagoya, all of (JP)

(73) Assignee: Paloma Industries, Limited, Aichi (JP)

( * ) Notice: Subject to any disclaimer, the term of this patent is extended or adjusted under 35 U.S.C. 154(b) by 0 days.

(21) Appl. No.: 09/954,836

(22) Filed: Sep. 18, 2001

(30) Foreign Application Priority Data

Sep. 19, 2000 (JP) .......................................... 12-283301

(51) Int. Cl.$^7$ .............................. A47J 37/00; A47J 37/12
(52) U.S. Cl. ............................. 99/344; 99/330; 99/337; 99/403; 126/351.1; 126/391.1
(58) Field of Search .......................... 99/327–330, 331, 99/336, 342–344, 403, 410; 126/391.1, 378.1, 351.1, 357.1, 350.1, 373.1, 390.1; 431/1, 6, 20, 30, 29, 31; 210/167, DIG. 8

(56) References Cited

U.S. PATENT DOCUMENTS

| | | | | |
|---|---|---|---|---|
| 4,289,111 A | * | 9/1981 | Duncan et al. | 126/391 |
| 4,715,807 A | * | 12/1987 | Yokoyama et al. | 431/1 |
| 4,808,107 A | * | 2/1989 | Yokoyama et al. | 99/330 X |
| 4,838,244 A | * | 6/1989 | Giles, Sr. et al. | 126/391 |
| 4,848,317 A | * | 7/1989 | Prudhomme et al. | 126/390 X |
| 4,848,318 A | * | 7/1989 | Brewer | 126/92 AC |
| 4,863,370 A | * | 9/1989 | Yokoyama | 431/1 |
| 5,297,474 A | * | 3/1994 | Tabuchi | 99/344 |
| 5,313,876 A | * | 5/1994 | Hilger et al. | 99/330 |
| 5,341,728 A | * | 8/1994 | Ejiri et al. | 99/344 X |
| 5,417,202 A | * | 5/1995 | Cote | 99/330 |
| 5,544,567 A | * | 8/1996 | Davis et al. | 99/344 X |
| 6,101,929 A | * | 8/2000 | Saito | 99/403 |

* cited by examiner

*Primary Examiner*—Timothy F. Simone
(74) *Attorney, Agent, or Firm*—Pearson & Pearson, LLP

(57) ABSTRACT

The invention provides a fryer that can prevent problems such as poorly cooked food when operation of an oil discharge valve is started and cooking oil is discharged, for example, to adjust the liquid level of the cooking oil within an oil vat. The fryer includes oil vats (13) and (14) for containing cooking oil, a burning device (17) for heating the cooking oil within the oil vats, an oil discharge pipe (33) that extends from the bottom of the oil vat and that discharges the cooking oil from a discharge opening at its end into a tank, and an oil discharge valve (35) that is disposed in the oil discharge pipe and that opens and closes the oil discharge pipe. Furthermore, the fryer is provided with a micro switch (47) and a contact piece (48) for detecting the open state of the oil discharge valve, and alarms (55) and (56) for giving a warning in accordance with the results of the detection by the micro switch (47) regarding the open state of the oil discharge valve. When the micro switch (47) detects that the oil discharge valve has continuously remained in an open state and a predetermined time has passed, heating by the burning device (17) is stopped by controls from control devices (60A) and (60B).

2 Claims, 6 Drawing Sheets

FRYER

BACKGROUND OF THE INVENTION

1. Field of the Invention

The present invention relates to a fryer in which an oil discharge pipe is opened and closed to discharge cooking oil in an oil vat by opening and closing an oil discharge valve that is disposed in the oil discharge pipe, which extends from the bottom of the oil vat.

2. Description of Related Art

Conventionally, in fryers of this type, some cooking oil is removed together with the foods after cooking the foods, so in order to supplement lost cooking oil, the oil vats are periodically replenished with cooking oil. For the cooking oil, when oil such as lard, which is a solid oil at normal temperature, is replenished, although it remains solid immediately after being added, the lard gradually melts, and when it has liquefied its volume increases, resulting in an increase of the liquid level in the oil vat and frequently causing the liquid level to exceed the prescribed liquid level. By the liquid level of the cooking oil in the oil vat fluctuating between above and below a certain range of the prescribed liquid levels, the heating conditions of the foods change, and the result is a disparity in cooked foods, which is undesirable. Consequently, to counter such over-replenishing of cooking oil, it is necessary to open an oil discharge valve and discharge excess cooking oil from an oil discharge pipe into an oil tank in order to maintain the liquid level of the cooking oil at the prescribed liquid level.

However, by opening the oil discharge valve, too much cooking oil may be discharged, or if the oil discharge valve is mistakenly left in a state in which it is incompletely closed, the cooking oil can fall below the prescribed liquid level, the heating temperature of the foods by the cooking oil become too high, and the cooked foods result in being uneven, which is undesirable. Furthermore, there is also the possibility that an accident, such as the cooking oil catching fire, could occur by abnormally over-heating the cooking oil. Moreover, in the case of when cleaning the inside of the oil vats, there is the possibility of an accident caused by abnormal-overheating of the cooking oil when the opening/closing valve is opened in order to release the cooking oil from the oil vat and when the oil vats are mistakenly heated.

For that reason, among conventional fryers, there are those that stopped heating of the oil at the same time that the oil discharge valve is opened. With these fryers, however, each time the oil discharge valve is opened during cooking, the foods become poorly cooked because of inadequate heating, and it is necessary to discard these poorly cooked foods, resulting in an extreme waste of foods. On the other hand, in other fryers, a warning goes off the moment the oil discharge valve is opened. However, even if a warning is sounded, if the cook cannot take quick measures in response to the warning such as closing the oil discharge valve or stopping the combustion of the fryer because the cook is too busy or absent, there is the problem that inconveniences caused in conjunction with the reduction in cooking oil in the oil vat could not be properly addressed.

The present invention solves the aforementioned problems, and an object of the present invention is to provide a fryer that can prevent inconvenience such as the poor cooking of foods when an oil discharge valve operation is initiated and the cooking oil is discharged, for example, to adjust the liquid level of the cooking oil within the oil vat.

SUMMARY OF THE INVENTION

To achieve the above-mentioned object, in accordance with a first aspect of the present invention, a fryer includes an oil vat for containing cooking oil, a burning device for heating the cooking oil in the oil vat, an oil discharge pipe that extends from the bottom of the oil vat and that discharges the cooking oil from a discharge opening at its end into a tank, and an oil discharge valve disposed in the oil discharge pipe and is for opening and closing the oil discharge pipe, wherein the fryer is provided with an open valve detection means for detecting an open state of the oil discharge valve, a warning means for giving a warning according to a dictated result of an open state of the oil discharge valve by the open valve detection means, and a combustion stopping control means for controlling the burning device so that it stops combustion when a period of time that the open valve detection means has continuously detected that the oil discharge valve is open reaches a predetermined time. Here, the predetermined time means the time lag giving the fryer safety that heating an empty oil vat such as the cooking oil catching fire will not occur even if the cooking oil is discharged in a state wherein the oil discharge valve is completely open.

With this configuration according to the first aspect of the invention, to counter, for example, the over-replenishing of cooking oil, when the oil discharge valve is opened and excess cooking oil is discharged from the oil discharge pipe into the tank in order to maintain the liquid level of the cooking oil at the prescribed liquid level, the open valve detection means detects that the oil discharge valve is in an open state, and in response, the warning means gives a warning that the oil discharge valve is in an open state. Thus, even after the oil discharge valve has been operated, without interrupting preparation for food, it is possible to clearly identify from the warning that the oil discharge pipe is open and that the cooking oil in the oil vat is being discharged.

Furthermore, when the oil discharge valve continuously remains open for a predetermined time, combustion by the burning device is automatically stopped with controls from the combustion stopping control means. That is, the burning device is stopped after a prescribed time has passed, wherein the prescribed time is the time lag giving the fryer safety before heating an empty oil vat such as the cooking oil catching fire occurs, and thus heating an empty oil vat can be prevented before it happens.

Moreover, with the configuration according to a second aspect of the invention, in a fryer according to the first aspect of the invention, a time lag is provided between when the oil discharge valve is first opened and when cooking oil begins to be discharged from the oil discharge pipe, and wherein the warning means gives a warning immediately after the oil discharge valve starts to open. Therefore, an operator can quickly be aware that the oil discharge valve is open, and there is leeway before the oil discharge valve is closed. In particular, the discharge of the cooking oil can be minimized in the event that the oil discharge valve is accidentally opened.

DESCRIPTION OF THE PREFERRED EMBODIMENTS

Figure 1:
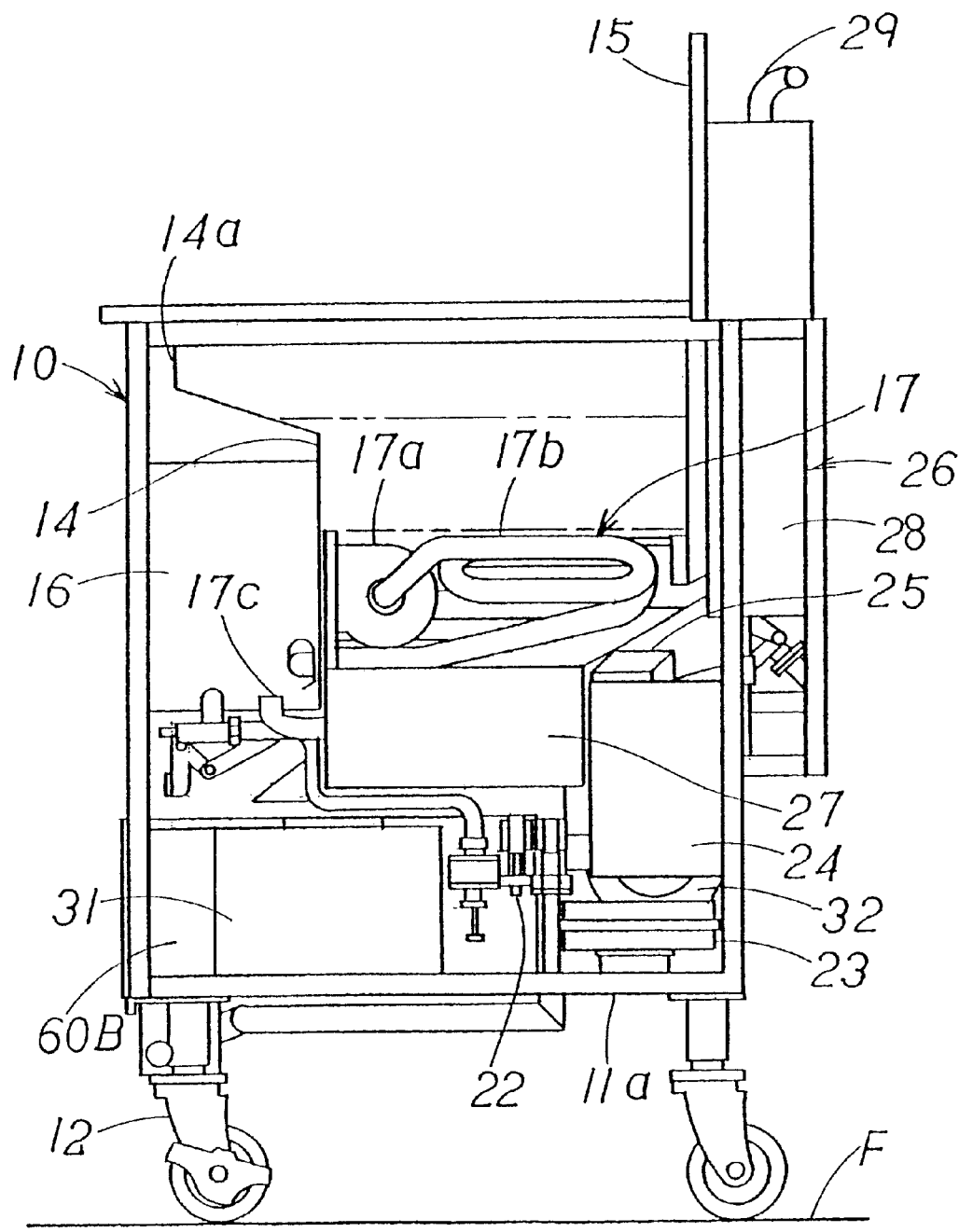
FIG. 1 is a lateral view showing the schematic configuration of one embodiment of the fryer of the present invention.
Figure 2:
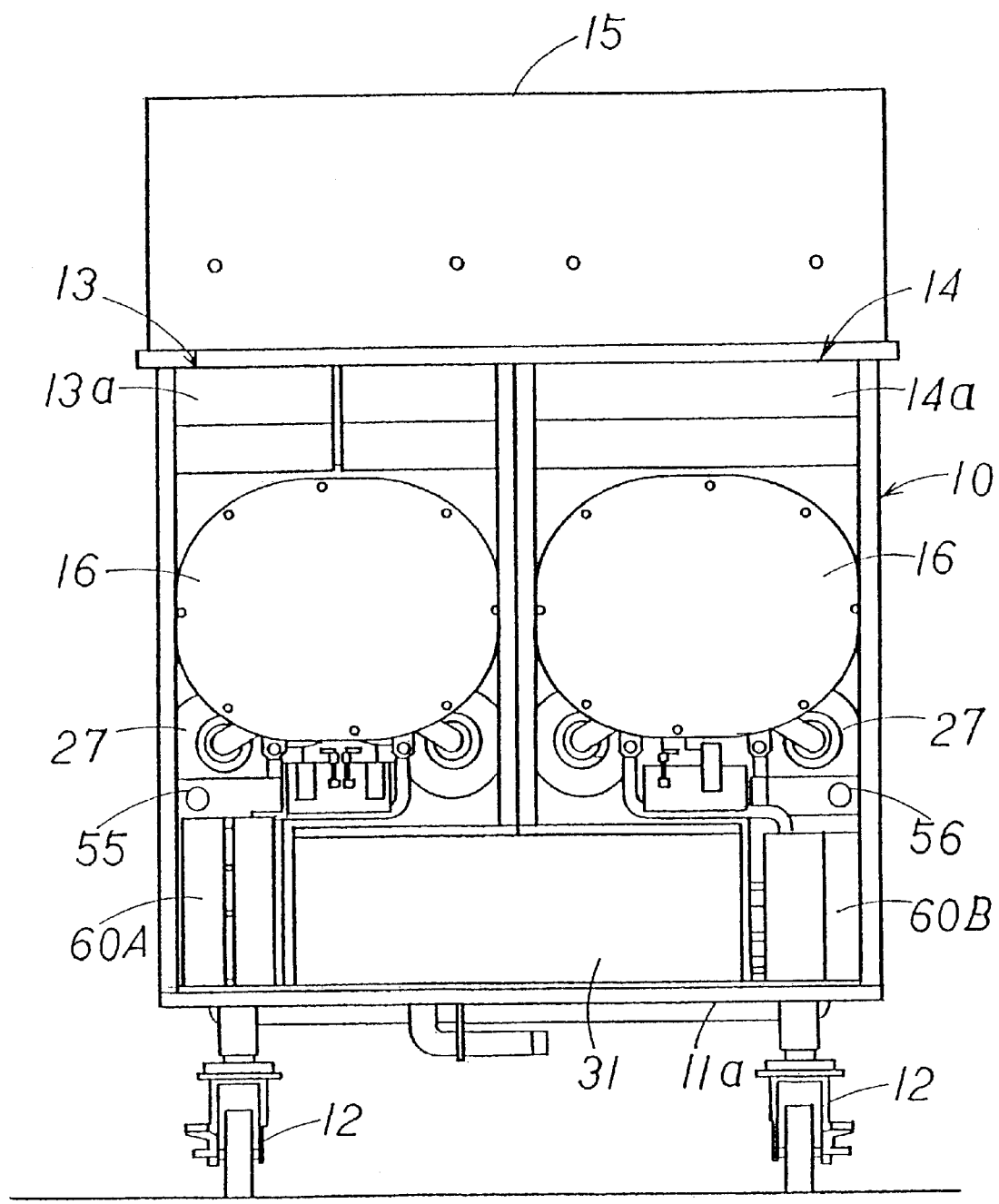
FIG. 2 is a front view showing the schematic configuration of the fryer in FIG. 1.
Figure 3:
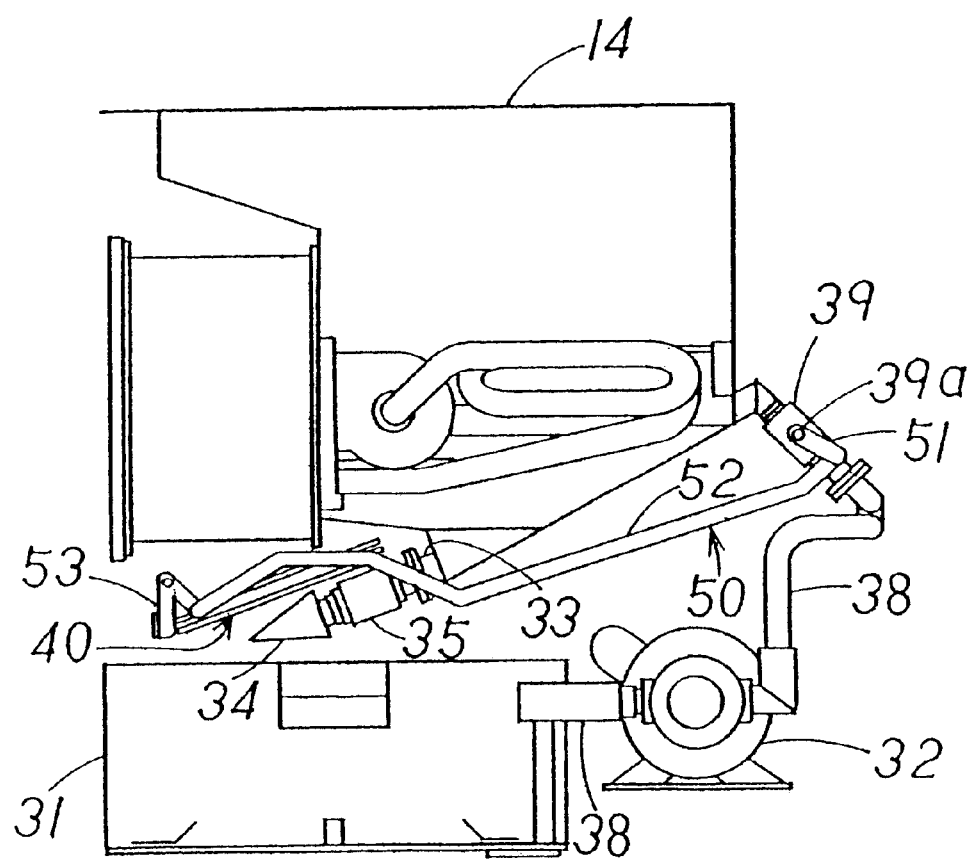
FIG. 3 is a lateral view showing the oil supply and discharge mechanism, which is a primary element of the fryer in FIG. 1.

An embodiment of the present invention is described below with reference to the drawings. FIG. 1 and FIG. 2 show a lateral view (excluding the right side panel) and a front view (excluding the front side plate) of a schematic configuration of a fryer for commercial use in this embodiment. FIG. 3 shows a lateral view of the cooking oil supply and discharge mechanism, which is an essential part of the fryer.

The fryer is provided with a box-shaped housing 10, and stands on a floor F, supported by casters 12 provided at the four corners of a bottom panel portion 11a of the housing 10. A pair of left and right oil vats 13 and 14 for containing cooking oil is provided in the upper portion of the housing 10, with the oil vat 13 on the left side being a split vat divided into two parts, and the oil vat 14 on the right side being a single full vat. The full vat has one oil supply pipe and one oil discharge pipe, and the split vat has two oil supply pipes and two oil discharge pipes.

Apron portions 13a and 14a, which are frame-shaped and have a front portion projecting forward, are integrally attached to the upper edge of the oil vats 13 and 14. A vertical panel 15 extending upward is provided on the rear wall of the apron portions 13a and 14a. A pair of air chambers 16 is attached to the front of the oil vats 13 and 14. A burning device 17 for heating the cooking oil in the oil vats is disposed on a side portion of the oil vats 13 and 14 (only the one corresponding to the oil vat 14 is shown). The burning device 17 is provided with a combustion chamber 17a fixed to the inner surface of a sidewall of the oil vat 14, and a pipe 17b disposed in a looping fashion within the oil vat 14 with one end fixed to the exit of the combustion chamber 17a and the other end passing through a sidewall of the air chamber 16, and serving as a conduit to the outside. The pipe 17b is in communication with an extension pipe portion 17c, which is fixed to a sidewall of the air chamber 16.

Each air chamber 16 is connected to a gas supply pipe 21, which is provided with an electromagnetic valve 22, and also connected, via an air supply pipe 25, with an electrically driven fan 23 and an air supply muffler 24. Additionally, the burning devices 17 are each provided with a silencing device 26. The silencing devices 26 are provided with a lower exhaust muffler 27 disposed on the lower side of the rear portion of the oil vats 13 and 14, and an upper exhaust muffler 28 disposed on the upper side of the rear portion of the oil vats 13 and 14. The exhaust mufflers are connected in series, and a release pipe 29 for releasing exhaust into the air is attached to the upper end of the upper exhaust muffler 28. An oil tank 31 is placed on the bottom panel portion 11a in the housing 10, and an oil pump 32 is provided at the rear portion of the oil tank 31.

As shown in FIG. 3, the supply and discharge mechanism is provided with a pair of oil discharge pipes 33 projecting from the oil vats 13 and 14, and an oil discharge collection potion 34 is attached to the end of the oil discharge pipes 33, so that oil is discharged from a discharge opening 34a of the oil discharge collection 34 into the oil tank 31 underneath.

An oil discharge valve 35 of a ball valve type is attached adjacent to the oil discharge collection portion 34 of the oil discharge pipe 33 for opening and closing the oil discharge pipe 33 according to the rotating position of the ball. A pair of symmetrical left and right valve opening/closing devices 40 are disposed on the oil discharge valve 35.

Figure 4:
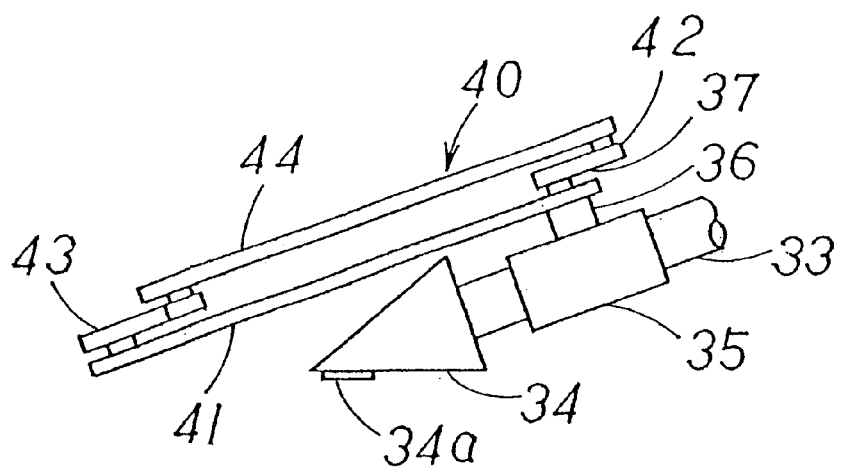
FIG. 4 is a lateral view showing the valve opening/closing device.
Figure 5:
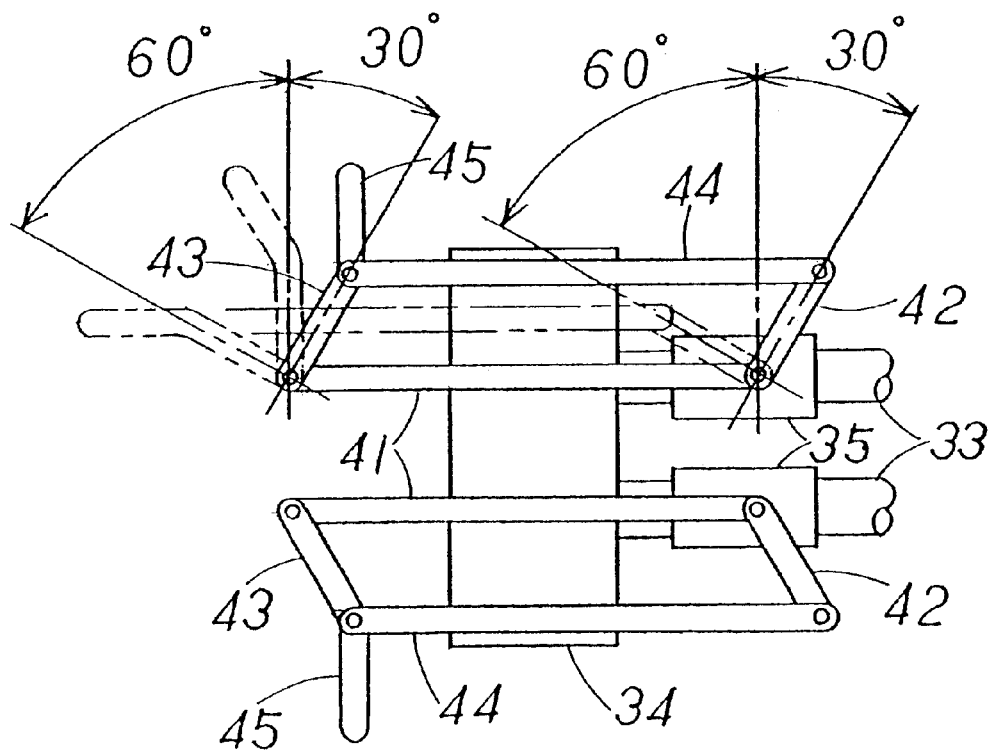
FIG. 5 is a planar view showing the valve opening/closing device of FIG. 4.

As shown in FIG. 4 and FIG. 5, the valve opening/closing device 40 is configured with a long bar-shaped fixed link portion 41, wherein one end is fixed to a protruding portion 36 of the valve at a rotating shaft 37 of the oil discharge valve 35, and wherein the fixed link portion 41 is substantially perpendicular with respect to the rotating shaft 37 and extends in the direction of the oil discharge collection portion 34; a first rotating link portion 42 of short bar-shape fixed at one end to the rotating shaft 37; a second rotating link portion 43 of a length substantially equal to that of the first rotating link portion 42, and which at one end is rotatably attached to the other end of the fixed link portion 41; a long bar-shaped coupling link portion 44 of a length substantially equal to the fixed link portion 41, wherein both ends are rotatably fixed to the other ends of the first and second rotating link portions 42 and 43; and a rotating lever portion 45 integrally fixed to the other end of the second rotating link portion 43, wherein the rotating lever 45 is disposed on the same surface as the second rotating link portion 43 and extends and tilts at substantially 30° forward with respect to the second rotating link portion 43.

When the oil discharge valve 35 is closed, the first and second rotating link portions 42 and 43 are tilted at a 30° angle to the rear with respect to a sideways orientation, and when the oil discharge valve 35 is open, the first and second rotating link portions 42 and 43 are tilted 60° forward with respect to a sideways orientation. Thus, when opening or closing the oil discharge valve 35, by rotating the rotating lever 45 for 90°, the oil discharge valve 35 can be easily closed in the same way. The result is that even women or elderly people, who have little strength, can easily perform the opening and closing operation of the oil discharge valve 35. Moreover, the position of the rotating lever 45 corresponding to the open state and closed state of the oil discharge valve 35 is regulated so that the rotating lever 45 is orientated sideways or frontward when viewed from the front surface, so that by looking at the position of the rotating lever 45 it is possible to ascertain with one glance whether the oil discharge valve 35 is in an open state or a closed state, and thus is extremely convenient.

Figure 6:
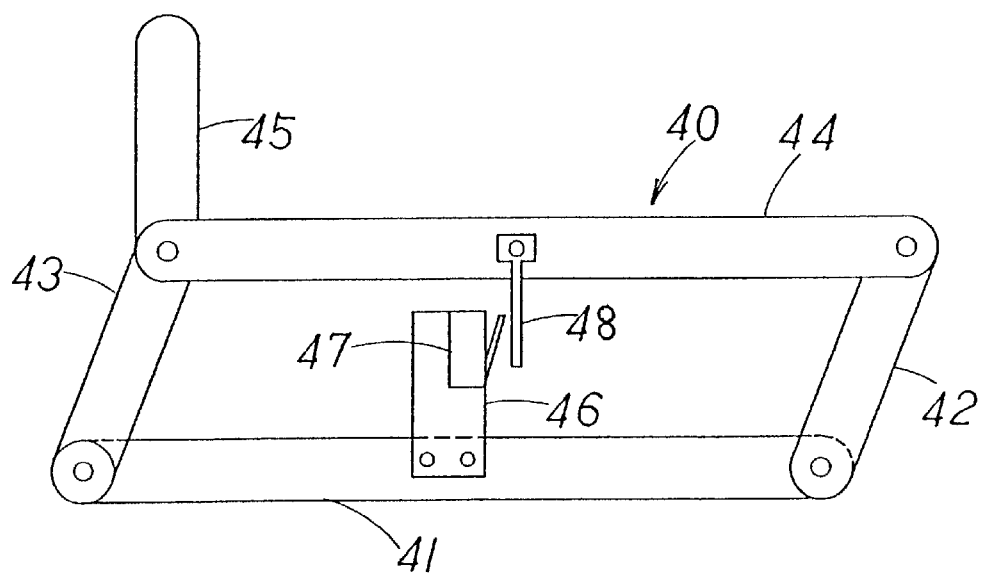
FIG. 6 is a lateral view showing the open/close detection portion of the oil discharge valve.

As shown in FIG. 6, an attaching plate 46 of a rectangular shape is fixed at one end side to an intermediate position of the longitudinal direction of the fixed link portion 41, and extends in the direction of the coupling link portion 44. A micro switch 47, of a type wherein movement of a movable piece pushes a contact point to activate the switch, is fixed to the other end of the attached plate 46. A contact piece 48 is fixed to an intermediate position of the longitudinal direction of the coupling link portion 44, and when the contact piece 48 comes into contact with the movable piece of the micro switch 47, it shifts that movable piece. The micro switch 47 and the contact piece 48 constitute a valve open/close detection means. In addition to the combination of the micro switch and the contact piece, a proximity switch that uses a reed switch, for example, can also be used. When the oil discharge valve 35 is opened by rotating the rotating lever 45, the contact piece 48 disposed on the coupling link portion 44 immediately pushes the movable piece of the micro switch 47 to come into contact with the contact point, thus turning the switch on. Here, the oil discharge valve 35 is of a ball valve type, and has a difference of roughly 5° in the rotating angle between when the rotating shaft 37 begins to rotate and when the pipe pathway opens. For that reason, even if alarms 55 and 56, which are explained later, start to sound by the oil discharge valve 35 starting to be opened, cooking oil is not immediately discharged from the oil vats 13 and 14, and by further rotation of several degrees after the alarm has sounded the oil is released.

The oil supply pipe 38 projects from the bottom of the oil tank 31, and is connected to the oil vats 13 and 14 via the oil pump 32. An oil supply valve 39 of a ball valve type is disposed in the oil supply pipe 38 on the downstream side of the oil pump 32. A valve opening/closing mechanism 50 is disposed on the oil supply valve 39. The valve opening/closing mechanism 50 is provided with a rotating link portion 51 of a short bar-shape that is fixed at one end to a rotating shaft 39a of the oil supply valve 39, a coupling link portion 52 of a long bar-shape that is rotatably attached to the other end of the rotating link portion 51, extends substantially horizontally until the front side of the housing 10, and is bent at a plurality of positions, and a lever portion 53 that is in the shape of the letter v, wherein the corner thereof is rotatably supported by the housing, and wherein one end is rotatably attached to the coupling link portion 52. The valve opening/closing mechanism 50, by the rotation operation of the lever portion 53, easily opens and closes the oil supply valve 39.

Figure 7:
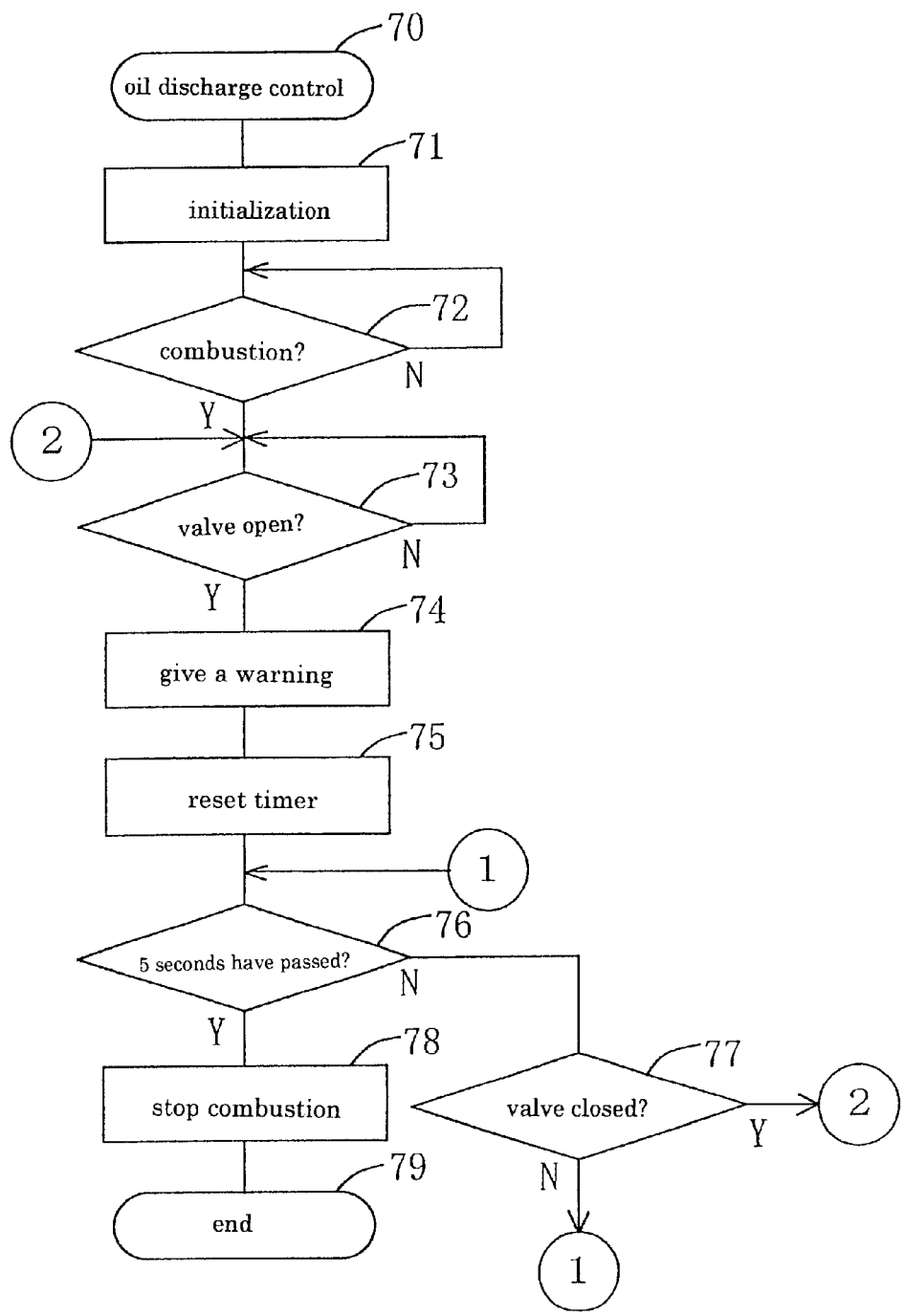
FIG. 7 is a flow chart of the "oil discharge control program" executed by the control device.

Alarms 55 and 56, which are warning means associated with the oil vats 13 and 14, are attached to the bottom left and right sides of the air chamber 16 on the front side of the housing 10. For the warning means, instead of an audible warning such as an alarm or a voiced message, it is also possible to execute a visual warning by using an illuminant, such as a lamp, or a display, such as a picture display device, or a combination thereof Control devices 60A and 60B, for electrically controlling the operation of the aforementioned supply and discharge mechanism, are disposed on both the left and right sides on the bottom panel portion 11a of the housing 10, and control the operation of the supply and discharge mechanism corresponding to the left and right oil vats 13 and 14, respectively. Below is an explanation of the control device 60B corresponding to the right oil vat 14. The control device 60B includes a microcomputer that is made up of a ROM, a CPU, a RAM, a counter, and an I/O device, for example, and that executes the "oil discharge control program" shown in FIG. 7. The micro switch 47 is connected to the input side of the control device 60B, and the alarms 55 and 56, the oil supply pump 32, and the electromagnetic valve 22 of the burning device 17, for example, are connected to the output side of the control device 60B.

Next is an explanation of the operation of the embodiment with this configuration.

By turning on a power switch, which is not shown in the drawings, the control device 60B starts executing the "oil discharge control program" at step 70, initializes the various control variables, and then determines whether combustion by the burning device 17 has begun or not (steps 71 and 72). If the combustion has already begun, the program determines whether the oil discharge valve 35 is open or not (step 73). When the oil level in the oil vats 13 or 14 is below the prescribed liquid level due to cooking, solid lard is added. At first the liquid level of the oil is at the prescribed liquid level when lard is added, but when the lard melts, the oil level may become higher than the prescribed liquid level. In such a case, by operating the valve opening/closing device 40, the oil discharge valve 35 is opened in order to lower the liquid level.

This operation turns on the micro switch 47, in response to that, the control device 60B starts sounding the alarm 56 and at the same time resets a timer and begins to measure time for a prescribed time of five seconds (steps 73 through 75). If the valve opening/closing device 40 is operated and the oil discharge valve is closed within the five seconds, the control device, based on the decisions of "NO" at step 76 and "YES" at step 77, returns the program to step 73 and executes the steps below in a similar fashion. Then, if the prescribed time of five seconds has passed with the alarm 56 still sounding, that is, with the oil discharge valve 35 being open, the combustion operation of the burning device 17 is stopped (step 78), and the controls for the control device 60A are ended (step 79).

As described above, according to the present embodiment, in accordance with the oil discharge valve 35 being open, the alarm 56 gives a warning that the oil discharge valve 35 is in an open state, and thus after the oil discharge valve 35 has been opened, the warning makes it possible to clearly ascertain that the oil discharge pipe 33 is open and that the cooking oil in the oil vat 14 is being discharged. In particular, should the oil discharge valve 35 be accidentally opened, it is possible to be immediately aware that the oil discharge valve 35 is open, which is convenient. Additionally, foods are not wasted because cooking is not interrupted. Furthermore, when the duration of open the oil discharge valve 35 reaches the prescribed time of five seconds, the combustion by the burning device 17 is automatically stopped, and thus accidents such as the cooking oil catching fire caused by heating the empty oil vats, can be prevented before they occur.

Moreover, as the oil discharge valve 35 is of a ball valve type, and there is a roughly 5° difference in the rotating angle between when the rotating shaft 37 starts rotating and when the pipe pathway is opened, even if the alarm 55 and 56 start to sound, by beginning to open the oil discharge valve 35 the cooking oil is not immediately discharged from the oil vats 13 and 14, and there is a slight delay before the cooking oil is discharged. Consequently, an operator can quickly be aware that the oil discharge valve 35 is open, there is still enough time to close the oil discharge valve 35, and in particular, the discharge of the cooking oil can be minimized in the event that the oil discharge valve 35 is accidentally opened.

According to the first aspect of the invention, after the oil discharge valve is operated, it can be clearly ascertained from the warning that the oil discharge pipe is open and that cooking oil in the oil vats is being discharged, without interrupting preparation for food. In particular, if the oil discharge valve is accidentally opened, an operator can be immediately aware that it is open, which is convenient. Furthermore, when the prescribed time of five seconds of the oil discharge valve being constantly open has passed, the combustion by the burning device is automatically stopped, and thus accidents such as the cooking oil catching fire caused by heating the empty oil vats, can be prevented before they occur.

Moreover, a time lag is provided between when the oil discharge valve is opened and when the cooking oil begins to be discharged from the oil discharge pipe, and immediately after the oil discharge valve starts to open, a warning means gives a warning that makes it possible to quickly inform that the oil discharge valve is open and to have time left to close the oil discharge valve. In particular, the discharge of the cooking oil can be minimized in the event that the oil discharge valve is accidentally opened (effect of the second aspect of the invention).

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description. All changes that come within the meaning and range of equivalency of the claims are intended to be embraced therein.

What is claimed is:

1. A fryer comprising:

an oil vat for containing cooking oil;

a burning device for heating the cooking oil within the oil vat;

an oil discharge pipe that extends from the bottom of the oil vat and that discharges the cooking oil from a discharge opening at its end into a tank;

an oil discharge valve that is disposed in the oil discharge pipe and that opens and closes the oil discharge pipe;

an open valve detection means for detecting an open state of the oil discharge valve;

a warning means for giving a warning according to a detected result of an open state of the oil discharge valve by the open valve detection means;

a combustion stopping control means for controlling the burning device so that it stops combustion when a period of time that the open valve detection means has continuously detected that the oil discharge valve is open reaches a predetermined time.

2. The fryer according to claim 1, wherein a time lag is provided between when the oil discharge valve is first opened and when the cooking oil begins to be discharged from the oil discharge pipe, and wherein the warning means gives a warning immediately after the oil discharge valve starts to open.

* * * * *